United States Patent
Oberlaender

(10) Patent No.: US 7,707,358 B2
(45) Date of Patent: Apr. 27, 2010

(54) DUAL ACCESS FOR SINGLE PORT CACHE

(75) Inventor: Klaus Oberlaender, Neubiberg (DE)

(73) Assignee: Infineon Technologies AG, Neubiberg (DE)

( * ) Notice: Subject to any disclaimer, the term of this patent is extended or adjusted under 35 U.S.C. 154(b) by 592 days.

(21) Appl. No.: 11/561,494

(22) Filed: Nov. 20, 2006

(65) Prior Publication Data

US 2008/0120466 A1 May 22, 2008

(51) Int. Cl.
*G06F 12/08* (2006.01)

(52) U.S. Cl. .................... 711/123; 711/128; 711/211

(58) Field of Classification Search .............. None
See application file for complete search history.

(56) References Cited

U.S. PATENT DOCUMENTS

| | | | | |
|---|---|---|---|---|
| 5,946,710 A | * | 8/1999 | Bauman et al. | 711/129 |
| 6,085,280 A | * | 7/2000 | Zink | 711/5 |
| 6,516,387 B1 | * | 2/2003 | Auracher | 711/123 |
| 6,594,728 B1 | * | 7/2003 | Yeager | 711/127 |

* cited by examiner

*Primary Examiner*—Gary J Portka
(74) *Attorney, Agent, or Firm*—Eischweiler & Associates, LLC

(57) ABSTRACT

A method and system for accessing a single port multi-way cache with way dedication includes address multiplexers that simultaneously addresses a set of data and a set of program instructions in the multi-way cache. Duplicate output way multiplexers respectively select data and program instructions read from the cache responsive to the address multiplexer.

8 Claims, 3 Drawing Sheets

DUAL ACCESS FOR SINGLE PORT CACHE

BACKGROUND

Caching of data in close vicinity of a processing core is a common approach of speeding up the performance of the microprocessor or other processing system. The cache may be a small memory that keeps data and/or instructions that were recently or often used. By keeping the data and/or instructions close to the processing unit, the latency of access is small, and overall processing speed may be increased versus accessing a larger system memory directly, which may have a higher latency of access.

There are multiple known approaches to caching for microprocessor systems. Many systems use separated data and program caches. This approach tends to be inflexible, as each cache is dedicated to either data or programs. Since applications may vary in the ratio of each required for efficient operation, separated data and program caches may not be optimized for different applications, and in fact tend to be larger than needed for many applications to ensure all applications run fast. Separate caches also imply twice the control overhead, and duplicates memory-periphery overhead, such as internal control, wordline decoders and sense amps.

In order to keep chip area used by the cache as small as possible, many systems use combined data and program caches which tend to be more flexible as they can be used by both data and program sides of the microprocessor. Many systems also allow for dedication of certain ways of a multiple way cache to either cache the instructions for a program fetch unit or the data for a load/store unit. This dedication is needed to prevent constant replacement of timing critical cached code portions by accessing data that are scattered in the memory and hence have a low hit rate. In such systems, the user can individually, such as through software, determine the exact division of the cache portions to the individual microprocessor sub units—(load/store vs. fetch unit). Performance may be poor in such systems as data and program accesses may be attempted simultaneously and in parallel, but the cache can only serve one access at a time. Thus, the bandwidth is only about one-half that of using separate caches. Using dual ported SRAMs requires much larger areas, and consumes more power. Such SRAMs would also create many difficult potential corner cases, which have to be solved by surrounding control logic.

DETAILED DESCRIPTION

In the following description, reference is made to the accompanying drawings that form a part hereof, and in which is shown by way of illustration specific embodiments which may be practiced. These embodiments are described in sufficient detail to enable those skilled in the art to practice the invention, and it is to be understood that other embodiments may be utilized and that structural, logical and electrical changes may be made without departing from the scope of the present invention. The following description of example embodiments is, therefore, not to be taken in a limited sense, and the scope of the present invention is defined by the appended claims.

A single ported cache is used to simultaneously provide data and instructions to a system in one embodiment. The system has simultaneous program fetches and data load/store accesses under the premise of using only single ported memories. Selected hardware surrounding the single ported cache is duplicated to allow basically the full bandwidth for simultaneous program and data accesses to be exploited provided there is way dedication for load/store and program data, while not adding significant area and not requiring dual ported memory or separated caches. The word "simultaneous" as used herein refers to the ability of the cache to provide data during a single fetch cycle, and need not be interpreted to mean that events should be occurring at exactly the same time. In some embodiments, the accesses may occur at approximately or substantially the same time.

Figure 1:
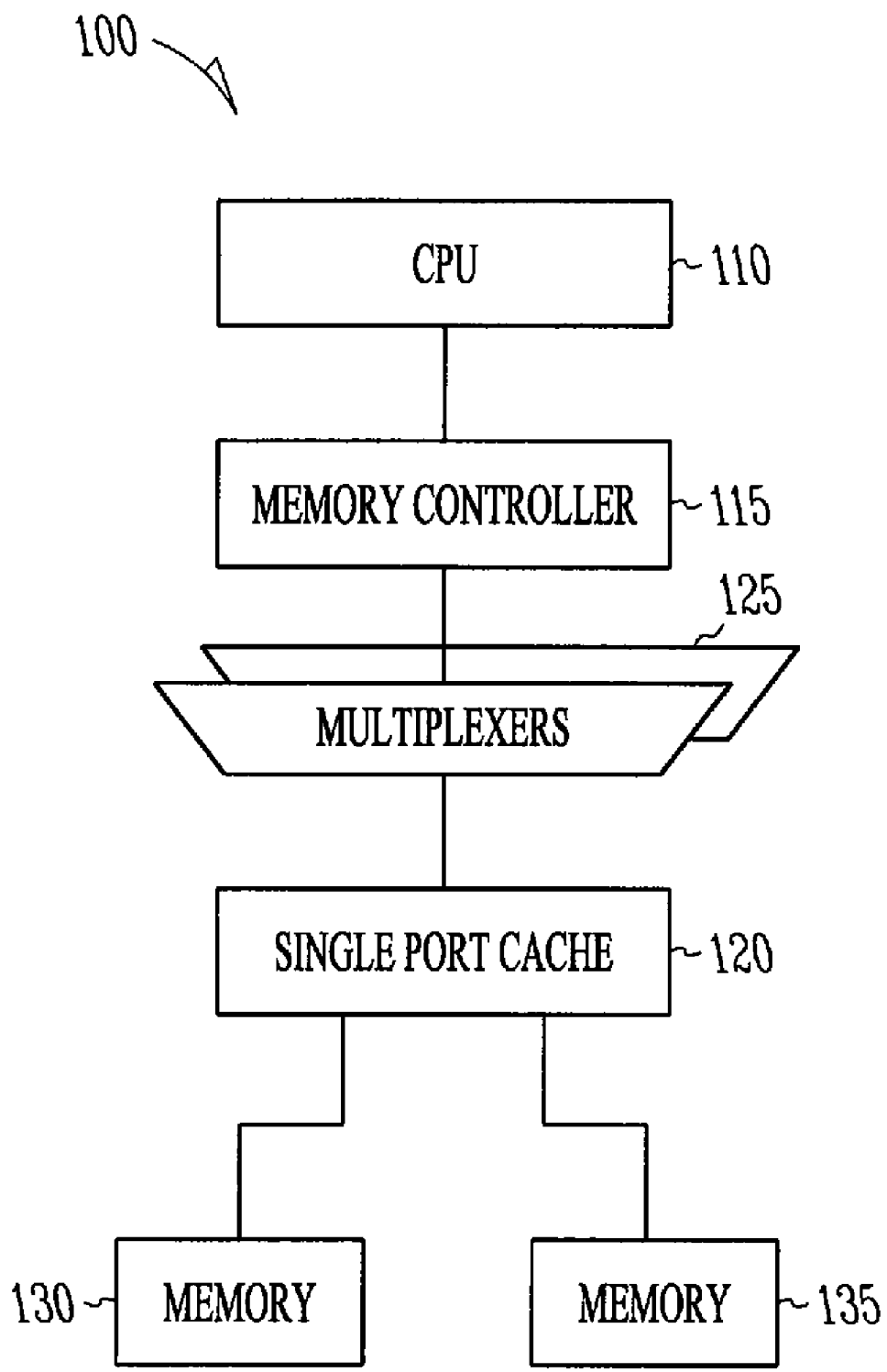
FIG. 1 is a block diagram illustrating a system for accessing a single port cache simultaneously for both data and program instructions according to an example embodiment.

FIG. 1 illustrates a system 100 that includes a processor 110. In one embodiment, the processor 110 may be a microprocessor, or any other type of processor that processes data in accordance with program instructions. Processor 110 has or is coupled to a memory controller 115. Memory controller 115 may include a program fetch unit and a data load/store unit that provides addresses for accessing programs and data in a single port cache 120. In some embodiments, further circuitry as shown below may be used to multiplex addressing of the cache 120, and determine whether requested information is within the cache. In some embodiments, such circuitry may be part of the memory controller or otherwise coupled to it and the cache.

An access of information in the cache may include access of both data and program instructions at the same time. The cache is a multi-way cache in one embodiment, with information from multiple sets of data in the ways being provided with each access of the cache. A pair of multiplexers 125, one for data and one for program instructions is used to separate out information received from the cache, such that both requested data and program instructions are output simultaneously. The data and program instructions may be stored at various memory or storage devices 130 and 135 for which the cache 120 provides faster access.

In Further embodiments, SRAMs with Tristate outputs may be used. The tristated outputs may be wired together the output enables controlled accordingly to allow only one SRAM to drive its data. A multiplexer may be implemented in multiple ways e.g. transfer gates, and/or solution, etc.) In a yet a further embodiment, two tristated outputs may be added to a memory and controlled individually.

In one embodiment, the bandwidth of the cache 120 is effectively doubled. In one embodiment, at least a 2-way cache is used. For further flexibility in utilizing more of the cache for data or program instructions, 4-way, 8-way or higher, such as 32-way caches may be used. Non powers of 2 may also be used, such as a 6-way cache. Thus, more ways may be allocated to data if an application is data intensive. The allocation of the ways to load/store or instruction may be reprogrammed for each application if desired without a redesign of the system architecture.

Figure 2:
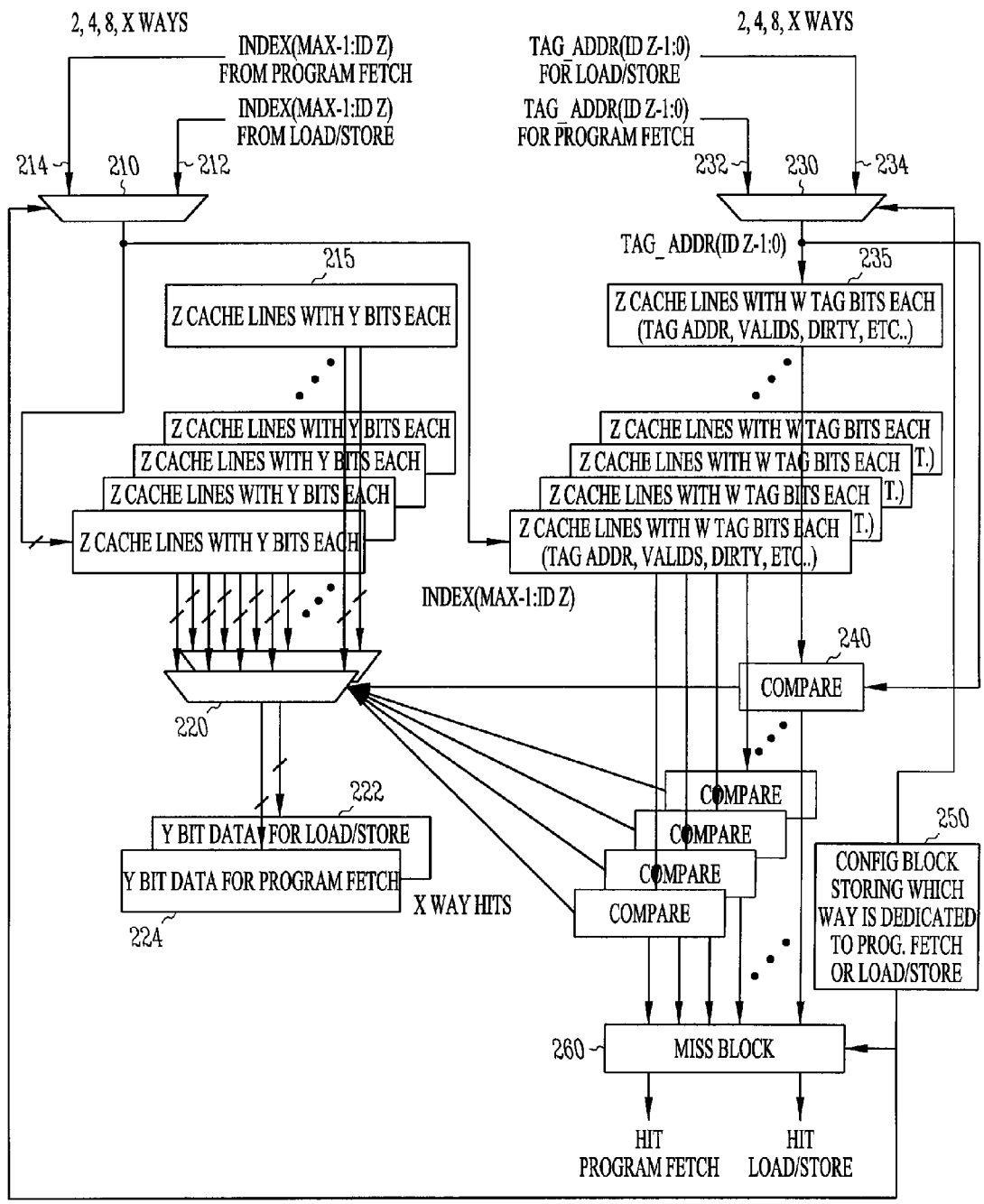
FIG. 2 is a block schematic diagram of a system for accessing a single port cache simultaneously for both data and program instructions according to an example embodiment.

FIG. 2 at 200, further detail of a system providing simultaneous access of data and program instructions from a single port cache is shown. An index address multiplexer 210 receives an index portion of two addresses from the processor.

While only one is shown, it is done for each way. The addresses in one embodiment are referred to as an index, one for a load or store of data at 212 and the other for a program instruction fetch at 214. The indexes, including a tag portion, are applied to a multiple way cache 215, which is shown as containing Z lines of data with y bits in each line, and Z lines of program instructions, with y bits in each line. The two different types of lines, data and program instructions, are respectively coupled to a pair of output multiplexers at 220, providing y bit data for load/store at 222 and y bit program instruction fetches at 224.

Since a cache may or may not contain the requested information, a mechanism for checking is also provided. Portions of the addresses used to access the cache also include tag address bits. Tag address bits are provided to a tag address multiplexer 230 which while only one is shown, exists for each way. Both tag address bits for program instruction fetch at 232 and data load/store 234 are provided to multiplexer 230. These bits are multiplexed and provided to a tag bit cache section 235, along with the multiplexed address per way from multiplexer 210. Tag bit cache section 235 includes Z lines with w tag bits each—tag address, valids, dirty, etc. They are further provided to multiple comparators 240, one for each way. Comparators 240 compare the tag address bits from the processor attempting to access the cache, to those stored in the cache to determine whether the information, be it data or program instructions, is currently stored in the cache 215. The comparators 240 are coupled to the output multiplexers 220 to control them to provide the data and instructions that are actually stored in the cache 215. A miss or no hit indication is provided if the data and/or instructions at 222 and 224 should be ignored. The comparators have two outputs and control both load/store and program independently in one embodiment. The control affect the multiplexer 220 and the hit logic 260. Other logic that is capable of comparing information and providing corresponding control may be used in place of the comparators if desired. Similarly, many different cache hit or miss algorithms may be employed.

A configuration block 250 provides cache configuration control to the multiplexers 210 and 230 to identify which sets of information and tag bits in the cache 215, 235 correspond to data and which correspond to program instructions. Configuration block 250 and comparators 240 are also coupled to a cache hit or miss block 260 to ensure that results are ignored if the tag bits did not identify a cache hit. Control of multiplexers 220 is also influenced accordingly by configuration block 250. There are 2 outputs of each comparator to the multiplexers 220 and only one output of the comparators is allowed to be activated by a hit as the other one is dedicated to another type of data.

In one embodiment, stall cycles and wait cycles in the processor 110, such as a microprocessor, due to collisions in the cache may be prevented. This is done by duplicating the address paths of each data/tag array of each way, which allows selection if the way should be controlled by the address of the load/store or program fetch units. Additionally, the control unit, which is also responsible for translating the way hit to the data multiplexer signals takes into account which way is enabled for load/store and program fetch and controls the two data multiplexers accordingly and independently of each other. Additionally, two hit signals are generated by the control logic, one for the load/store and one from the program fetch unit, again taking the way dedication to load/store and program fetch units into account. Additionally the control logic makes sure, that in a case where two misses happen simultaneously, one miss in the load/store access and one on the program fetch access, the necessary refills and possibly necessary write back are done sequentially. Such cache misses may be handled in a known manner.

A typical embodiment has at least 4 or 8 ways, while two will work, but not provide flexibility in assigning varying cache portions. Other numbers of ways, such as 5, 6 or 7 are also possible. A data bus may have a width of 16, 32 or 64 bits for a data portion of the cache and approximately 64 or 128, or even 256 lines in each way. The number of lines per way may be much larger or smaller in various embodiments. Each cache line may typically be a multiple of the data bus width, such as 4×64 bits. For example, one cache line (characterized by one entry in the tag array) may have 4 lines worth of data in the data portion assigned to it. In such a case, the lower bits of the address define which part of the cache line is to be read and the upper address bits decide which index. The same index selects the tag entry in the tag arrays which only exists once per cache line in one embodiment. The tag entry contains the address tags, typically about 20 bits wide, depending on the number of cache lines and address bus width of the processor. In one embodiment, the address space may be addressed by an address bus width of 32bits, or higher in future embodiments. Additionally the tag stores information about the status of the cache line, such as if it is dirty and/or valid. The tag may also contain parity bits of the tag portion and the parities for the data portions. Parity bits for data may alternatively be stored with the data. Parity and error correction bits may be used if desired, but are not required.

In further embodiments, the system 200 may include multiple other caches, as well as random access main memory, removable storage and non-removable storage. System 200 may include or have access to a computing environment that includes input, output, and a communication connection. The system may operate in a networked environment using a communication connection to connect to one or more remote computers. The remote computer may include a personal computer (PC), server, router, network PC, a peer device or other common network node, or the like. The communication connection may include a Local Area Network (LAN), a Wide Area Network (WAN) or other networks.

Figure 3:
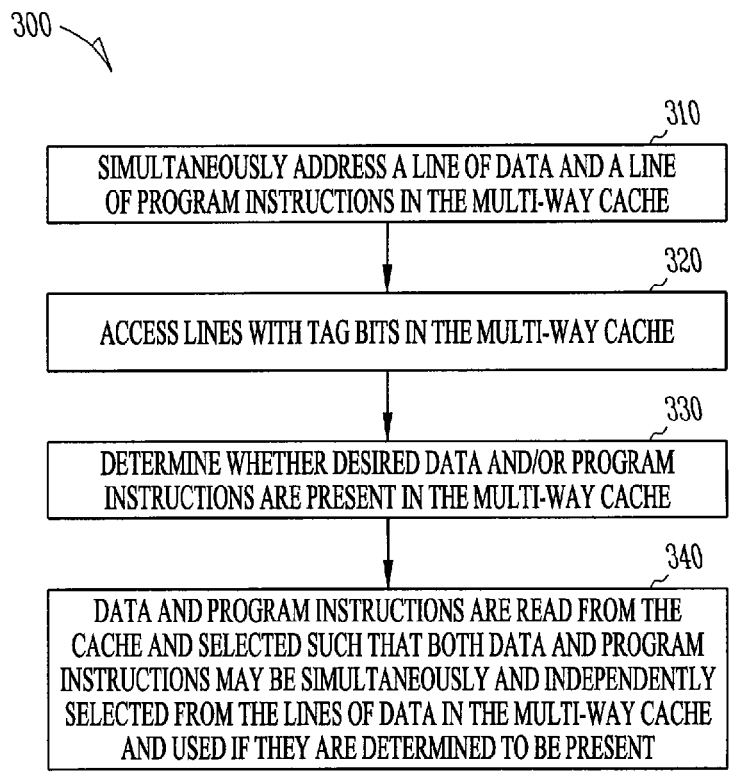
FIG. 3 is a flowchart illustrating a method for accessing a single port cache simultaneously for both data and program instructions according to an example embodiment.

FIG. 3 is a flowchart illustrating a method 300 of simultaneous access of a multi-way cache, which is single ported. At 310, the method simultaneously addresses a way or set of data and a way or set of program instructions in the multi-way cache. At 320, sets with tag bits are also accessed in the multi-way cache. The method then determines at 330 whether desired data and/or program instructions are present in the multi-way cache. At 340, data and program instructions read from the cache are selected such that both data and program instructions are selected from the sets of data in the multi-way cache provided they are determined to be present.

Figure 4:
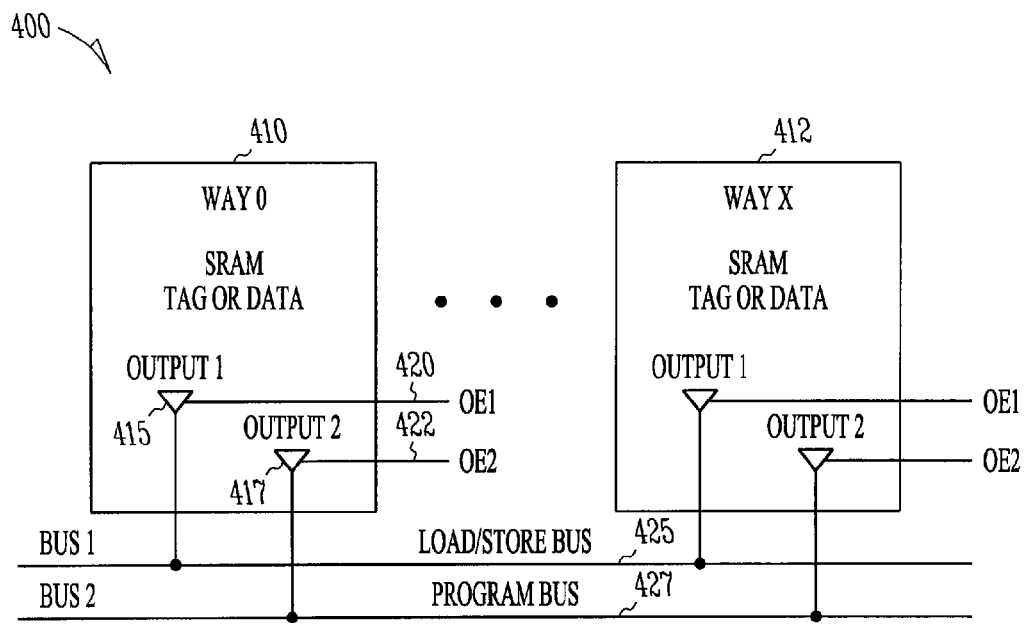
FIG. 4 is a block schematic diagram of an alternative arrangement to multiplexers in FIG. 2.

In a further embodiment as illustrated at 400 in FIG. 4, multiple busses may be used as an alternative to multiplexers. An SRAM has multiple ways as represented by way 0 at 410 to way x at 412. Each way has a first output OUT1 415 and a second output OUT 2 at 417. The outputs are enabled at corresponding output enable OE1 at 420 and OE2 at 422. The outputs are coupled to a load/store bus 425 and a program bus 427. The busses perform similarly to output multiplexers in this embodiment.

The Abstract is provided to comply with 37 C.F.R. §1.72(b) to allow the reader to quickly ascertain the nature and gist of the technical disclosure. The Abstract is submitted with the understanding that it will not be used to interpret or limit the scope or meaning of the claims.

The invention is claimed is:

1. A system for accessing a single port multi-way cache, the system comprising:

an address index multiplexer for each way that simultaneously addresses a line of data and a line of program instructions in the multi-way cache, and provides an index into sets with tag bits in the cache;

an address tag bit multiplexer for each way that accesses sets with tag bits in the multi-way cache;

comparators coupled to the address tag bit multiplexers and the multi-way cache that compares tag bits from both to determine whether desired data and/or program instructions are present in the multi-way cache;

duplicate output way multiplexers coupled to the comparators that selects data and program instructions read from the cache responsive to the address multiplexers such that both data and program instructions are simultaneously selected from the sets in the multi-way cache.

2. The system of claim 1 and further comprising a configuration block coupled to the address index multiplexers and the address tag bit multiplexers, wherein the configuration block identifies ways dedicated to data and ways dedicated to program instructions.

3. The system of claim 2 and further comprising a hit indicator coupled to the comparators and controlled by the configuration block for providing hit indications for both a program instruction fetch and a data load/store.

4. The system of claim 1 wherein a variable number of ways are dedicated to data and other ways are dedicated to program instructions.

5. The system of claim 1 wherein two accesses are interleaved in the single port multi-way cache in a single cycle.

6. The system of claim 1 wherein the multi-way cache is at least a 2-way cache.

7. The system of claim 1 wherein the multi-way cache is at least a 4-way cache.

8. The system of claim 1 wherein the multi-way cache is at least a 6-way cache.

* * * * *